United States Patent [19]

Fischer et al.

[11] Patent Number: 5,849,567
[45] Date of Patent: Dec. 15, 1998

[54] METHOD OF DECONTAMINATING SOLID MATERIALS CONTAMINATED WITH HEAVY METALS

[75] Inventors: Klaus Fischer, Dachau; Hans-Peter Bipp, München; Peter Riemschneider, Eichenau; Antonius Kettrup, Arnsberg; Dieter Bieniek, Unterschleissheim, all of Germany

[73] Assignee: GSF-Forschungszentrum für Umwelt und Gesundheit GmbH, Munich, Germany

[21] Appl. No.: 847,852

[22] Filed: Apr. 28, 1997

Related U.S. Application Data

[63] Continuation-in-part of Ser. No. 414,095, Mar. 31, 1995, abandoned.

[51] Int. Cl.[6] ......................................................... B09B 3/00
[52] U.S. Cl. ........................................ 435/262.5; 210/912
[58] Field of Search ........................ 435/262.5; 210/661, 210/666, 681, 683, 684, 685, 688, 912; 588/1, 252

[56] References Cited

U.S. PATENT DOCUMENTS

| | | | |
|---|---|---|---|
| 4,083,783 | 4/1978 | Wing et al. | 210/54 |
| 4,267,049 | 5/1981 | Erickson et al. | 210/606 |
| 4,287,069 | 9/1981 | Reischl et al. | 210/609 |
| 4,320,093 | 3/1982 | Volesky et al. | 423/6 |
| 4,355,137 | 10/1982 | Winter | 525/54.1 |
| 5,178,762 | 1/1993 | Pokora et al. | 210/632 |
| 5,292,456 | 3/1994 | Francis et al. | 252/628 |

*Primary Examiner*—David A. Redding
*Attorney, Agent, or Firm*—Klaus J. Bach

[57] ABSTRACT

In a method for reducing the content of heavy metals of solid materials, particularly of soils, a 0.1–10% aqueous solution of chemically modified biomasses of waste and residue materials is applied to the solid material whereby the heavy metals are released and extracted from the solid material. The biomass solution residues remaining in the solid material after the heavy metal extraction procedure is rapidly biodegradable so that no objectionable traces remain in the solid materials or soils.

12 Claims, 3 Drawing Sheets

METHOD OF DECONTAMINATING SOLID MATERIALS CONTAMINATED WITH HEAVY METALS

This application is a continuation-in-part of application Ser. No. 08/414,095, filed Mar. 31, 1995, now abandoned.

BACKGROUND OF THE INVENTION

The invention resides in a method of decontaminating solid materials, particularly soils contaminated with heavy metals by subjecting them to nature-identical organic chelate forming compounds which are obtained by chemical modification of bio-mass waste materials of food production and food processing plants.

Old contaminations, but also sediments, soils and other materials comprise solid materials which potentially include heavy metal contaminations. If, as it may easily happen, such materials are moved and if they are deposited at another location, heavy metal compounds can be set free and cause toxic damages. Therefore, especially physical and chemical processes have been developed with the object to remove the heavy metals from the environment materials.

For the removal of metals from contaminated soils, usually soil washing procedures are utilized at this time which combine a mechanical particle size classification with acidic or basic solution treatment of the metal enriched soil portion. Such treatment procedures, however, have several disadvantages and lead to a substantial destruction of the soil material which is ecologically not desirable. A substantial part of the fine and very fine particles is carried away by the wash water, that is, it becomes wasted. Also, high process costs limit the applicability to cases of extremely high contaminations.

Methods for the metal extraction by means of aqueous solutions of synthetic organic complex formers such as EDTA (ethyldramine tetra acetic acid) or NTA (nitrilotriacetic acid) are conceptually and technically related to the process presented herein.

There are, however, substantial differences between the known processes and the process presented herein:

a) The compounds utilized in the prior art processes are totally synthetic and foreign to nature.

b) Some of these compounds (EDTA) have little biodegradability.

c) As a result, residues may be formed which may result in a secondary contamination of the extracted material.

d) There are toxicological considerations against the extraction and the presence of relatively large amounts of these compounds in the environment.

e) The use of these compounds does not contribute to the ecologically desirable enviro-technological utilization of waste and residue materials.

There is, therefore, a continuing need for decontamination procedures for heavy metal contaminated solid materials utilizing biogenic easily bio-degradable compounds by which the above disadvantages can be avoided.

SUMMARY OF THE INVENTION

In a method for reducing the content of heavy metals of solid materials, particularly of soils, a 0.1–10% aqueous solution of chemically modified biomasses of waste and residue materials is applied to the solid material whereby the heavy metals are released and extracted from the solid material. The biomass solution residues remaining in the solid material after the heavy metal extraction procedure are rapidly biodegradable so that no objectionable traces remain in the solid materials or soils.

For the extraction of the heavy metals from the contaminated soils by subjecting them to aqueous chelate-former containing solutions (the chemically modified biomasses of waste and residue materials of food processing plants) conventional extraction processes and apparatus are utilized as mentioned before. These include agitator tank reactors, countercurrent reactors, in situ extraction processes etc., as they are generally used today. Such processes are described in various publications, for example:

Rayhaven et al., "CLEANING EXCAVATED SOIL USING EXTRACTION AGENTS: A STATE-OF-THE-ART REVIEW, Final Report, June 1985–1989", Energy Research Abstracts, vol. 15, No. 1, Jan. 15, 1990, Office of Scientific Technical Information, DOE;

C. W. Francis, "AN ASSESSMENT OF SOIL WASHING TO REMOVE URANIUM AND MERCURY FROM OAK RIDGE SOILS", The Department of Energy's Soil Washing Work Shop, Aug. 28–29, 1990.;

Achakzy, D. et al., (1988) "STATUSBERICHT ZUR ALTLASTENSANIERUNG-TECHNOLOGIEN UND FORSCHUNGS-& ENTWICKLUNGSAKTIVITÄTEN. Kap. 5.4: Extraktions- u. Waschverfahren, S. 148–172. Bonn (i.A. des Bundesministers für Forschung und Technologie).

Beyer, K. Et al., (1989) Reinigung schwermetallkontaminierter Böden. In: Thome-Kozmiensky, K. J. [Hrsg.] Altlasten, Bd. 3. Berlin (ef-Verlag).

Kokemüller, D. et al (1988): VERFAHREN ZUR EXTRAKTION VON SCHWERMETALLEN AUS BELASTETEN BÖDEN UND VORRICHTUNG ZUR GEGENSTROM—EXTRAKTION BEI EINEM SOLCHEN VERFAHRNEN. European patent application EP 0 278 328 A1.

They include generally the following process steps:

a) Separation of large, solid soil parts (stones, wood pieces) by sifting, b) introduction of the contaminated material into the extraction container and addition of the extraction solution. Adjustment of the process variables that is, their optimization taking into consideration composition and concentration of the contaminants, the mineral composition of the soils, particle size distribution, the desired degree of decontamination and the extraction solution used.

Process variables are:

solid/liquid ratio pH value reaction time extraction temperature number of extraction steps.

c) separation of decontaminated soil and extraction solution for example by filtration, centrifugation, sedimentation, use of hydrocyclones etc., d) final washing of the soil with water e) separation of the dissolved heavy metals from the extraction solution for example by attachment to chelate resins (ion exchangers), liquid—liquid extraction with water-insoluble strong organic complex formers or adsorption to special microorganisms.

f) Recirculation of the extraction solution, after removal of the heavy metals therefrom with addition of fresh extraction solution.

The process according to the invention is based on the use of naturally occurring organic compounds, mainly organic chelate formers which furthermore are obtained by chemical modification of biomass waste materials and which are rapidly biodegradable when applied to the soil. The organic complex-forming mixtures utilized in connection with the present invention are of biogenic origin and are therefore easily biodegradable. As source of these mixtures, waste materials particularly from food processing plants are utilized. Generally, these waste materials must be converted by hydrolytic or oxidation procedures.

For the complex-forming capability of the mixtures and, consequently, the release of the heavy metals, essentially low molecular organic compounds such as aliphatic (hydroxy-) carbonic acid, ketocarbonic acid, saccharic acid, ketosaccharic acid and amino saccharines are responsible.

The effect of the chelate formers which are applied in an aqueous solution to the heavy metal contaminated materials corresponds to the reaction processes which occur in the soil under natural conditions and which lead, in this case, to a mobilization that provides for a redistribution of the heavy metals.

For example, biogenic and pedogenic organic chelate-forming compounds affect the solubility, the distribution, the bio-availability and the ecotoxicity of heavy metals in soils, sediments and also in other solid phases. They influence cation exchange processes, adsorption and desorption equilibriums as well as precipitation and dissolution processes and they change the redox-dependent stabilization ranges of metal species. Compounds with reduction capabilities contribute to the solution of aluminum- manganese- and iron oxides and consequently to the release of additional adsorbed or crystal-bound heavy metals.

The release of heavy metals from the contaminated materials however, does not depend only on the concentration and the properties of the primary reaction partners (the type of bindings and specific coordination schematic of the metal; complexification properties of the tying structure and formation strength of the respective chelate species) but also on the pH, the redox potential and the electrolyte composition. In this connection, the forming constants of the complex compounds are important but not exclusively determining factors for the judgment of the leaching efficiency of the tying structures.

Furthermore, parameters which have an influence on the process for the dissolution of the metal ions out of the solid material matrices have to be considered, such as the adsorption kinetics of the bonding structures, the structure and reactivity of the transition complex, the pH dependent solubility of the complex as well as its resorbability.

For the evaluation of the environmental relevance of toxic heavy metals, the total content of heavy metals is less important than the potentially bio-available part. The determination of the potentially bio-available heavy metals which are not retained in the crystal structure of minerals is generally achieved by extraction with EDTA. For the determination of the bond type of heavy metals also sequential extractions are employed. For the recycling or the disposal of heavy metal waste materials, that is, for their immobilization or mobilization, it is very important to know the bond types of the heavy metals.

Alone the knowledge of the heavy metal content in soils given in mg/kg without additional information cannot be interpreted ecotoxicologically or at least only to a very limited degree (A. Schulte, F. Beese; Z. Pflanzenernahr. Bodenk.157, 295–303, (1994)). The evaluation of the quality of a soil rehabilitation procedure accordingly should not be performed on the basis of the amount of the toxic material removed in relation to the total toxic material content but on the basis of the amount of the ecotoxicologically relevant and bio-available toxic material.

The invention will be described on the basis of examples given in connection with the accompanying drawings.

DESCRIPTION OF THE METHOD ON THE BASIS OF TESTS

Figure 1:
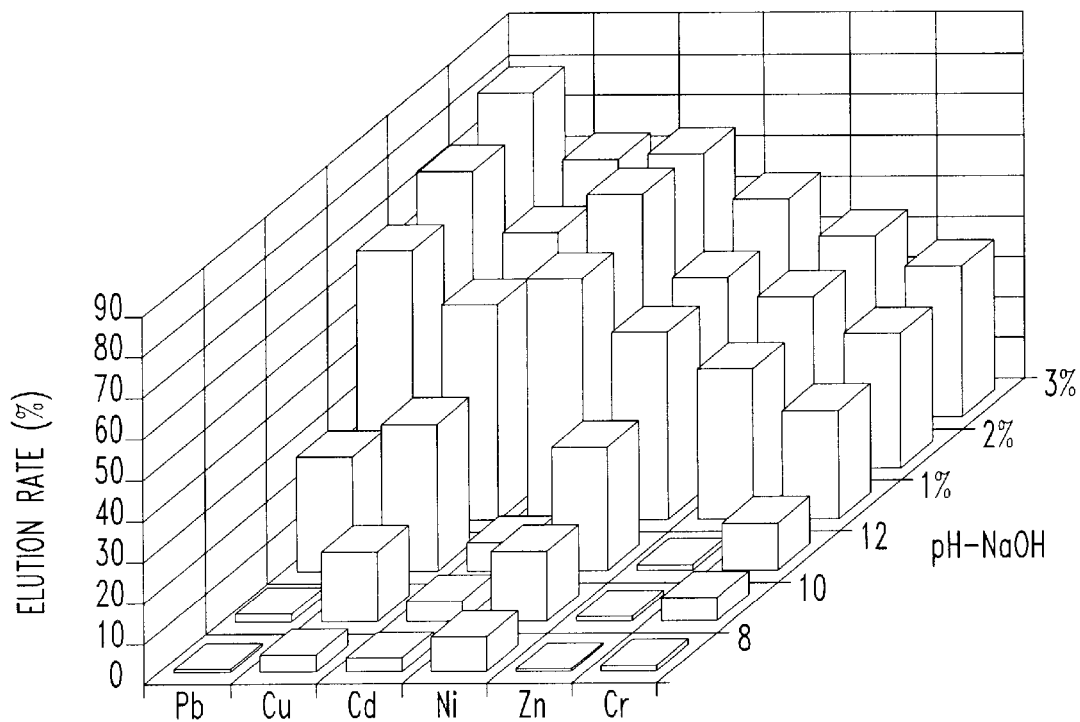
FIG. 1 shows the elution rates obtained with a 2% gluconic acid solution for various heavy metals and with various pH values in a 24 hour long test.

All tests for the release of heavy metals were performed with an anthropogenically contaminated soil whose properties are represented in Tables 1, 2, and 3.

The metal extraction was performed in batch type procedures with a solids/liquid ratio of 1:10 with different complex former concentrations. The test pH values were in a range of 4.5–>13 and mostly little complex forming buffers were used for the pH value stabilization. Samples were taken from the suspension within predetermined time intervals (up to maximally 4 days) soil particles separated by centrifuging and the liquid phase was tested for its metal content by ICP-AES. The calculated extraction rates represent the ratio between the dissolved metal content and the total metal content as determined by aqua regia digestion.

TABLE 1

Results of the Chemical and Mineralogical Characterization of the Test Soils Utilized

| Soil Type | Crushed limestone residual soil with high humus content |
|---|---|
| Particle Size Distribution (<2 mm) | clay (30%), silt (43%), sand (27%) |
| CEC in mval/100 g | 34.2 (percolation procedure) |
| Carbonate in % | 13.4 |
| Organic Substance in % | 10.6 |
| pH | 6.6 (0.01 m $CaCl_2$) |

TABLE 2

Heavy Metal Contents and General Values According to the Settling Sludge Regulation (SSR)

| Heavy Metals | Cd | Cr | Cu | Ni | Pb | Zn |
|---|---|---|---|---|---|---|
| Concentration in the Soil (mg/kg) | 33 | 234 | 279 | 54 | 987 | 1638 |
| Concentration According to SSR (mg/kg) | 1.5 | 100 | 60 | 50 | 100 | 200 |
| Error Factor | 22.3 | 2.3 | 4.7 | 1.1 | 9.9 | 8.2 |

TABLE 3

Binding Specific Characterization of the Soil-Based Metals According to Zeien and Brümmer*

| Phase in % | Cd | Cr | Cu | Ni | Pb | Zn |
|---|---|---|---|---|---|---|
| 1. Mobile | 2.1 | 0.2 | 2.4 | 1.3 | 0.1 | 0.4 |
| 2. Easily Applicable | 35 | 0.1 | 2.8 | 5.7 | 2.7 | 9.0 |
| 3. Bound to Mn Oxide | 25 | 0.4 | 1.7 | 4.3 | 7.7 | 13 |
| 4. Organically Bound | 32 | 6.7 | 62 | 29 | 77 | 53 |
| 5. Bound to Badly Crystallized Fe Oxide | 0.7 | 45 | 22 | 20 | 1.4 | 9.2 |
| 6. Bound to Crystallized Fe Oxide | 0.4 | 29 | 1.1 | 17 | 2 | 9.3 |
| 7. Residual Fraction | 5.1 | 19 | 7.3 | 22 | 9.4 | 5.7 |

*Zeien, H. and Brümmer, G. W. (1989): Chemische Extraktion zur Bestimmung von Schwermetall Verbindungen in Böden (Chemical Extraction for the Determination of Heavy Metal Compounds In Soils) Mitterlungen, Deutsche Bodenkundliche Gesellschaft 59,505–510.

Composition of Some Hydrolysates of Residues

Example for an oxidation digestion:

The starting compounds listed in Table 4 were subjected to 30% concentrated nitric acid for about 4 hours at 85° C. in a chemical reaction container and were then neutralized providing as digestion products chemically modified biomasses. The digestion products were separated utilizing a high pressure liquid chromatograph by way of ion exchange chromatography in a separation column suitable for the separation of organic solutions and were quantified according to their UV-absorption at 210 nm.

TABLE 4

Chemical Composition of the Oxidation Digestion Products of Sugar Containing Residues and Various Carbohydrates

| Compound | molasses [g] | sucrose [g] | peeling sludge [g] | starch [g] | whey powder [g] |
|---|---|---|---|---|---|
| oxalic acid* | 1.63 | 1.63 | 1.92 | 1.32 | 0.24 |
| glucaric acid* (saccharic acid) | 2.75 | 2.54 | 3.92 | 2.56 | 3.27 |
| gluconic acid* (saccharic acid) | 1.59 | 1.07 | 0.69 | 1.05 | — |
| malonic acid* | 0.81 | — | — | — | 1.14 |
| glycolic acid* | 1.24 | 0.23 | 1.2 | — | 1.42 |
| formic acid* | 0.67 | — | — | — | 0.43 |
| acetic acid* | 0.25 | 0.64 | 1.45 | — | 3.65 |

*Chelate Formers

The amount of residues was specifically (corresponding always to 5 g total sugar); molasses 10 g, whey powder 11.6 g, peeling sludge 10 g, sucrose and starch 5 g each. When considering the yield of saccharic acids, it is to be noted that, as a result of the oxidation of the sugar to saccharic acid, a mass gain occurred to some extent by oxygen addition.

As a source for the saccharic acids, in principle, all carbohydrate containing residues are suitable. Tests were further made with yeast and fermentation residues (fungus mycelium).

Further production possibilities are:

electrochemically $H_2O_2$ or $H_2O_2/h^*v$ or $H_2O_2+NaOH$ $Br_2$ (Halogen) or $I_2+NaOH$ $O_2$/catalyzer (Pt) or $O_2+NaOH(KOH)$ enzymatically

HEAVY METAL EXTRACTION WITH SACCHARIC ACID SOLUTIONS

For calculating the leaching efficiency of the saccharic acid containing solutions, the rates are listed below which can be achieved with chelate former (TOC-) free caustic soda (reference solutions).

TABLE 5

Extraction with Pure Caustic Soda - Extraction Rate [%]

| pH Value or % NaOH content | Pb | Cu | Ni | Cd | Cr | Zn |
|---|---|---|---|---|---|---|
| pH 8 | 0.0 | 1.6 | 4.4 | 2.5 | 0.0 | 0.0 |
| pH 10 | 0.9 | 13.1 | 8.9 | 3.0 | 1.0 | 0.7 |
| 1% - NaOH | 4.8 | 47.2 | 27.5 | 19.8 | 2.6 | 4.2 |
| 2% - NaOH | 9.6 | 52.2 | 31.5 | 15.9 | 2.3 | 13.1 |
| 3% - NaOH | 14.2 | 54.4 | 31.5 | 14.3 | 2.7 | 21.8 |

Already with pure NaOH, particularly for Cu and Ni, large amounts of heavy metals are released. The reason herefor is the formation of hydroxo-complex compounds in the highly alkaline medium (high NaOH concentration).

EXAMPLE 1

Extraction with a method relevant pure substance. A gluconic acid solution of about 2% was adjusted, with NaOH, to a pH value of 8, 10, and 12 and is stabilized by a buffer. Further, gluconic acid solutions with NaOH contents of 0.5%–3% were prepared. The extraction was performed with a solid/liquid ratio of 1:10. The release rates are given in Table 6 and FIG. 1.

Whereas with a pH value of 8, only Ni is extracted in noticeable amounts, with a 1% NaOH concentration (pH~12.5), the release rates for Pb, Cu, Cd and Cr jump up substantially.

TABLE 6

Metal Release (in %) with a 2% Gluconic Acid Solution with Various pH Values and NaOH Concentrations, Test Duration: 24 Hours

| pH Value or % NaOH content | Pb | Cu | Ni | Cd | Cr | Zn |
|---|---|---|---|---|---|---|
| pH 8 | 0.8 | 4.1 | 9.2 | 3.5 | 1.4 | 0.4 |
| pH 10 | 2.0 | 17.5 | 17.5 | 5.6 | 5.8 | 0.9 |
| pH 12 | 28.1 | 35.6 | 27.3 | 7.1 | 11.3 | 0.8 |
| 1% NaOH | 67.1 | 52.4 | 46.3 | 56.7 | 26.3 | 36.71 |
| 2% NaOH | 74.7 | 58.6 | 47.9 | 65.9 | 32.8 | 43.0 |
| 3% NaOH | 83.3 | 64.1 | 56.3 | 64.0 | 37.1 | 46.2 |

For determining the process efficiency, the ratio between the metal release in the gluconic acid solution to that in a gluconic acid-free NaOH solution of the same pH value and otherwise the same test conditions is calculated. This leads to the following situation:

TABLE 7

Ratio of the Metal Release with/without Gluconic Acid

| pH Value or % NaOH content | Pb | Cu | NI | Cd | Cr | Zn |
|---|---|---|---|---|---|---|
| pH 8 | — | 2.6 | 2.0 | 1.4 | — | — |
| pH 10 | 2.2 | 1.3 | 2.0 | 1.9 | 5.8 | 1.3 |
| 1% NaOH | 14 | 1.1 | 1.7 | 2.9 | 10.1 | 8.7 |
| 2% NaOH | 7.8 | 1.1 | 1.5 | 4.1 | 14.3 | 3.3 |
| 3% NaOH | 5.8 | 1.2 | 1.8 | 4.5 | 13.7 | 2.1 |

Considering the elution rates obtainable already with pure caustic soda, it becomes quite clear that a highly alkaline gluconic acid solution will provide for particularly good extraction of lead and chromium, but also of zinc. The selection of the extraction conditions is dependent on two criteria:

maximum efficiency and careful treatment of the material maximum metal release.

The advantage of the process is that, in a flexible way dependent on the restitution requirements, an optimal compromise between both criteria can be found.

EXAMPLE 2

Extraction with a residue hydrolysate.

Figure 2:
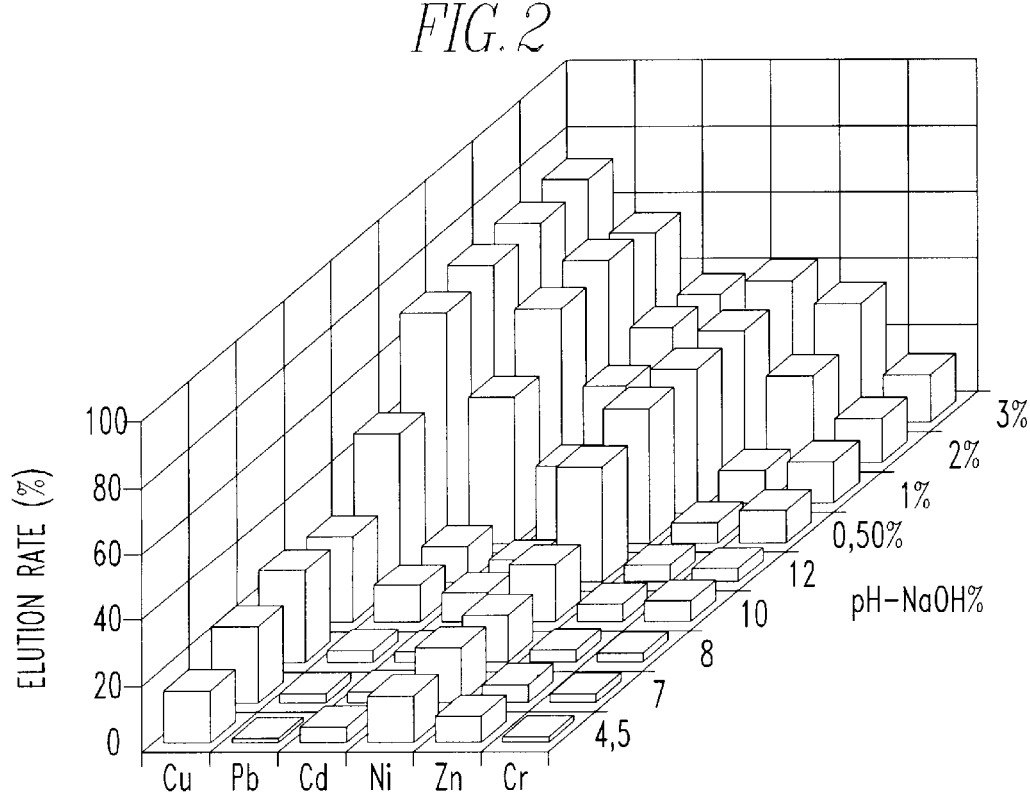
FIG. 2 shows the elution rates obtained with molasses hydrolysate with various pH values in 24 hour long tests.
Figure 3:
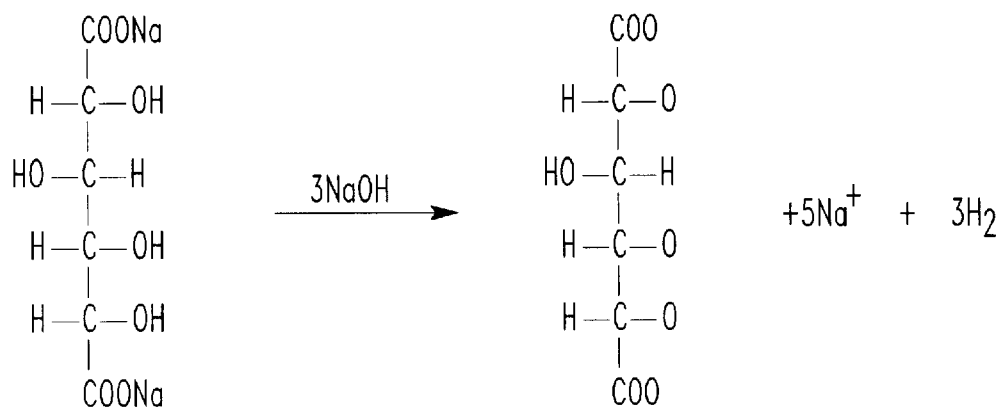
FIG. 3 shows the proton release from sugar hydroxyl groups when subjected to caustic soda.

As described above, 10 mg molasses were oxidized. The hydrolysate was adjusted to about a 0.85% saccharic acid content. The pH values 8–12 were stabilized by a buffer and adjusted with NaOH. The saccharic acid solutions with a 0.5%–3.0% NaOH content were prepared by the addition of the respective amounts of NaOH. The solid/liquid ratio at the extraction was 1:10. The elution rates are given in Table 7 and FIG. 2.

TABLE 8

Metal Release (in %) by Molasses Hydrolylsate/Test Duration: 24 Hours

| pH Values or % NaOH - Content | Pb | Cu | Ni | Cd | Cr | Zn |
|---|---|---|---|---|---|---|
| pH 4.5 | 1.7 | 14.4 | 13.9 | 5.0 | 2.0 | 7.5 |
| pH 7 | 2.7 | 21.4 | 15.7 | 3.3 | 2.3 | 5.0 |
| pH 8 | 3.6 | 27.1 | 14.0 | 3.1 | 2.1 | 3.2 |
| pH 10 | 11.6 | 26.1 | 16.7 | 8.7 | 6.3 | 5.4 |
| pH 12 | 11.9 | 45.0 | 34.7 | 7.1 | 4.5 | 5.0 |
| 0.5% NaOH | 43.6 | 70.2 | 41.1 | 23.3 | 9.5 | 6.2 |
| 1% NaOH | 58.3 | 72.2 | 40.7 | 35.1 | 12.2 | 10.1 |
| 2% NaOH | 61.0 | 72.6 | 41.0 | 40.9 | 13.8 | 27.5 |
| 3% NaOH | 58.0 | 73.8 | 43.3 | 39.3 | 14.1 | 37.5 |

For determining the process efficiency the ratio of the metal release by the molasses hydrolysate and the molasses hydrolysate—free NaOH solution with the same pH values and otherwise identical test conditions is calculated. This leads to the following situation:

TABLE 9

Ratio of Metal Release with/without Molasses Hydrolysate

| pH Values or % NaOH - Content | Pb | Cu | Ni | Cd | Cr | Zu |
|---|---|---|---|---|---|---|
| pH 8 | —* | 16.9 | 3.2 | 1.2 | —* | —* |
| pH 10 | 12.8 | 2.0 | 1.9 | 2.9 | 6.3 | 7.7 |
| 1% NaOH | 12.1 | 1.5 | 1.5 | 1.8 | 4.7 | 2.4 |
| 2% NaOH | 6.4 | 1.3 | 1.3 | 2.6 | 6.0 | 2.1 |
| 3% NaOH | 4.1 | 1.4 | 1.4 | 2.7 | 5.2 | 1.7 |

*The metal release in reference solution is almost zero

It is apparent that with the addition of 1% NaOH, the elution rate is substantially increased by the presence of the chelate forming compounds, particularly for Pb (about 12 times) and also for Cr (about 5 times) the two metals most difficult to mobilize. Also for the remaining metals, a substantially increased mobilization is apparent.

Except for nickel, where, with an increasing pH value, a continuous increase in the mobilization is achieved, for all metals a sudden increase in the metal release is apparent with the addition of 0.5% concentrated NaOH solution. In this respect, the soil extraction by molasses hydrolysate corresponds to a large degree with the results obtained for the treatment with one of the lead substances that is gluconic acid.

The explanation for the pH effect resides in the transformation of the hydroxy groups of the saccharic acids in alcoholate groups under alkaline conditions (eliminations of protons) which, with their negative charge, can additionally bond cations in a coordinative manner and increase substantially thereby the chelate forming properties of the saccharic acids.

The increase of the NaOH concentration from 1%–3% has obviously a relatively small influence on the elution rates of Cu, Ni, Cr, Cd, and Pb. This indicates that, already with a 1% NaOH concentration, all hydroxy groups have lost the available protons and the maximum complex-forming capacity has been reached. The additional increase in the elution rate which, except for Zn, is not particularly great does not result from additional complex formations, but from a higher solubility of the heavy metals in a more alkaline environment.

Review of Additional Elutions with Residue Biomass—Hydrolysates

TABLE 10

Percentage Release of Metals by Sugar - Containing Residue Hydrolysates at pH 7 and with the Addition of 0.5% NaOH to the Biomass Oxidation Products

| Hydrolysates | | Cd | Cu | Ni | Zn | Pb | Cr |
|---|---|---|---|---|---|---|---|
| Molasses | pH 7 | 3.3 | 21.4 | 15.7 | 5 | 2.7 | 2.3 |
| | 0.5% | 23.3 | 70.2 | 41 | 6.2 | 43.6 | 9.5 |
| Peel Sludge | pH.7 | 7.1 | 18.5 | 16.8 | 3.4 | 0.7 | 1.3 |
| | 0.5% | 18.7 | 57.7 | 34 | 3.8 | 35.6 | 7 |
| Whey Powder | pH 7 | 2.6 | 20.5 | 14 | 4.3 | 1.9 | 2.8 |
| | 0.5% | 22.4 | 64.8 | 35.8 | 6 | 53 | 11.3 |

Note: Elution Time - 24 Hours; Saccharic Acid Concentration About 1%

The pH influence on the metal release by various hydrolysates is apparent. Under normal conditions, the best elution rates for Cu, Zn and Pb are achieved with molasses. For Cd and Ni, peel sludge is best and for Cr, it is whey der. Considering the more alkaline conditions, one finds that molasses provides the best results for Cd, Cu, Ni, and Zn. With whey powder, the best results are achieved for Pb and Cr.

Under neutral conditions, the order of mobilizability is as follows: Cu>Ni>Zn>Cd>Pb>Cr. Under alkaline conditions, the order is: Cu>Pb>Ni>Cd>Zn>Cr.

Multistage Extraction

EXAMPLE 3

Figure 4:
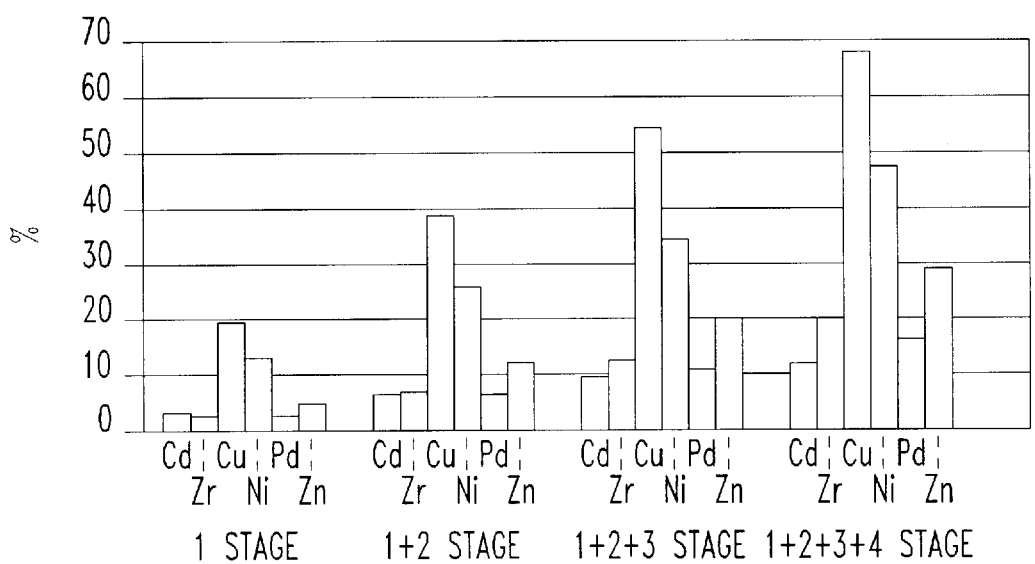
FIG. 4 shows the cumulative effect of multiple extraction steps with molasses hydrolysate for various metals.

A molasses hydrolysate containing about 1.9 wt % saccharic acid was adjusted to a pH value of 7 and was shaken with soil in a solid/liquid ratio of 1:10 for 24 hours. Subsequently, the hydrolysate was centrifuged out and fresh solution was added. This procedure was repeated twice more. The results of this multiple extraction are given in Table 11 and in FIG. 4.

The figure show the compounded extraction rates.

TABLE 11

Elution Rates of Multiple Extractions in %

| | Pb | Cu | Ni | Cd | Cr | Zn |
|---|---|---|---|---|---|---|
| 1.Stage | 2.6 | 19.4 | 12.8 | 3.3 | 2.4 | 4.5 |
| 1. + 2.Stage | 6.7 | 39.3 | 25.8 | 6.2 | 7.1 | 12 |
| 1. + 2. + 3.Stage | 11.0 | 54.1 | 34.6 | 9.1 | 12.7 | 19.9 |

TABLE 11-continued

Elution Rates of Multiple Extractions in %

|  | Pb | Cu | Ni | Cd | Cr | Zn |
|---|---|---|---|---|---|---|
| 1. + 2. + 3. + 4.Stage | 15.7 | 67.8 | 47.4 | 11.9 | 19.9 | 29.0 |

EXAMPLE 4

Figure 5:
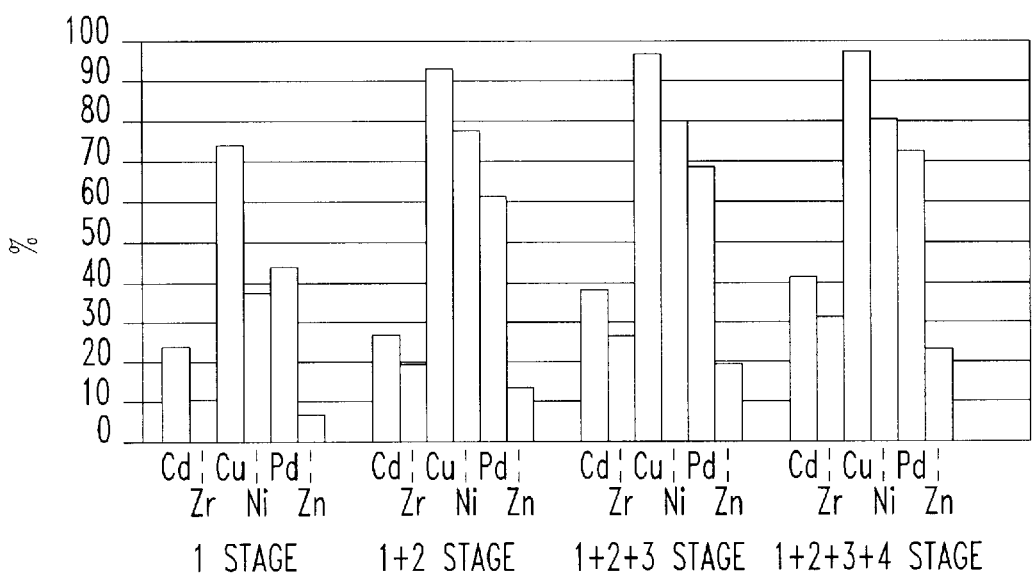
FIG. 5 shows the cumulative effect of multiple extraction steps with a 0.5% KOH containing molasses hydrolysate for the same metals as shown in FIG. 4.

A 1.9% saccharic acid containing molasses hydrolysate was adjusted to 0.5% KOH content and was shaken with soil in a solid/liquid ration of 1:10 for 24 hours. Subsequently, the extraction solution was centrifuged out and replaced by fresh hydrolysate. This procedure was repeated twice more. The results of this multiple extraction are presented in Table 12 and in FIG. 5.

TABLE 11

Elution Rates of Multiple Extractions in %

|  | Pb | Cu | Ni | Cd | Cr | Zn |
|---|---|---|---|---|---|---|
| 1.Stage | 44.6 | 74.7 | 38.0 | 24.0 | 10.2 | 5.9 |
| 1. + 2.Stage | 61.9 | 93.3 | 78.6 | 33.4 | 20.2 | 12.8 |
| 1. + 2. + 3.Stage | 69.3 | 96.8 | 79.9 | 38.5 | 26.6 | 18.8 |
| 1. + 2. + 3. + 4.Stage | 73.4 | 98.1 | 81.7 | 42.2 | 31.6 | 23.4 |

It should be apparent that the aqueous solutions used for the extraction of the heavy metals include, in all the examples given, only organic substances derived from waste materials and residues with the addition of up to 15% by weight based on the total organic carbon content (TOC) of natural compounds.

What is claimed is:

1. A method for reducing the content of heavy metals in solid materials comprising the steps of subjecting a biomass consisting of at least one of molasses, succrose, peeling sludge, starch, whey powder and carbohydrate-containing residues to an oxydation digestion process to provide chemically modified biomasses, preparing a 0.1–10% aqueous solution of said chemically modified biomasses, and extracting heavy metals containing compounds from said solid materials using said aqueous solution of said chemically modified biomasses.

2. A method according to claim 1, wherein said heavy metals containing compounds which are extracted from said material include Cu, Zn, Ni, Cd, Pb, and Cr.

3. A method according to claim 1, wherein said aqueous solution used for the extraction of the heavy metals includes only organic substances derived from waste materials and residues with the addition of up to 15% by weight based on the total organic carbon content (TOC) of natural compounds.

4. A method according to claim 1, wherein all chemically identifiable major compounds of said aqueous solution used for the extraction of said heavy metals are naturally occurring compounds.

5. A method according to claim 4, wherein said chemically identifiable compounds are rapidly biodegradable when applied to soils.

6. A method according to claim 4, wherein said chemically identifiable compounds comprise essentially chelate formers adapted to cause the release of said heavy metals.

7. A method according to claim 6, wherein said chelate formers comprise compounds with at least two metal coordinating molecule groups.

8. A method according to claim 7, wherein said metal coordinating molecule groups include one of carboxyl COOH)— and hydroxyl (OH—)— groups.

9. A method according to claim 1, wherein said digestion process comprises chemical oxidation of said biomasses.

10. A method according to claim 1, wherein said digestion process comprises electrochemical conversion.

11. A method according to claim 1, wherein said digestion process comprises conversion by hydrogenperoxide.

12. A method according to claim 1, wherein said digestion process comprises enzymatic conversion.

* * * * *